US012548749B2

(12) United States Patent
Sugawara et al.

(10) Patent No.: US 12,548,749 B2
(45) Date of Patent: Feb. 10, 2026

(54) MASS SPECTROMETER

(71) Applicant: Hitachi High-Tech Corporation, Tokyo (JP)

(72) Inventors: Yuka Sugawara, Tokyo (JP); Masuyuki Sugiyama, Tokyo (JP); Yuichiro Hashimoto, Tokyo (JP); Hiroyuki Yasuda, Tokyo (JP); Riku Tamura, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 452 days.

(21) Appl. No.: 17/908,147

(22) PCT Filed: Feb. 10, 2021

(86) PCT No.: PCT/JP2021/005079

§ 371 (c)(1), (2) Date: Aug. 30, 2022

(87) PCT Pub. No.: WO2021/176986

PCT Pub. Date: Sep. 10, 2021

(65) Prior Publication Data

US 2023/0136178 A1 May 4, 2023

(30) Foreign Application Priority Data

Mar. 5, 2020 (JP) ................................ 2020-038168

(51) Int. Cl.
*H01J 49/06* (2006.01)

(52) U.S. Cl.
CPC .......... *H01J 49/061* (2013.01); *H01J 49/063* (2013.01); *H01J 49/065* (2013.01)

(58) Field of Classification Search
CPC ...... H01J 49/061; H01J 49/063; H01J 49/065; H01J 49/06
See application file for complete search history.

(56) References Cited

U.S. PATENT DOCUMENTS

| | | | |
|---|---|---|---|
| 8,581,182 | B2 | 11/2013 | Giles |
| 2016/0189946 | A1 | 6/2016 | Nishiguchi et al. |

(Continued)

FOREIGN PATENT DOCUMENTS

| | | | |
|---|---|---|---|
| WO | WO 2014/203305 A1 | 12/2014 | |
| WO | 2016/067373 A1 | 5/2016 | |
| WO | WO 2016/135810 A1 | 9/2016 | |

OTHER PUBLICATIONS

International Search Report (PCT/ISA/210) issued in PCT Application No. PCT/JP2021/005079 dated May 11, 2021 with English translation (five (5) pages).

(Continued)

*Primary Examiner* — Wyatt A Stoffa
*Assistant Examiner* — Christopher J Gassen
(74) *Attorney, Agent, or Firm* — Crowell & Moring LLP

(57) ABSTRACT

To provide a mass spectrometer for higher ion permeation efficiency. In a mass spectrometer to transfer ions generated in an ion source 101 to a detector 106 through a vacuum chamber equipped with electrodes, the vacuum chamber includes a first vacuum chamber 107 and a second vacuum chamber 108 communicated by a pore 104 and an air flow containing ions introduced from the ion source 101 into the first vacuum chamber 107 is separated to an air flow 704 and an ion flow 703 by an ion guide 103 in the first vacuum chamber 107. The first vacuum chamber 107 has a current plate 113 to reduce mixing of the separated air flow 704 and ion flow 703.

10 Claims, 16 Drawing Sheets

(56) References Cited

U.S. PATENT DOCUMENTS

| | | | |
|---|---|---|---|
| 2017/0092477 | A1 | 3/2017 | Giles et al. |
| 2018/0025896 | A1 | 1/2018 | Sugiyama et al. |
| 2019/0237317 | A1 | 8/2019 | Giles et al. |

OTHER PUBLICATIONS

Japanese-language Written Opinion (PCT/ISA/237) issued in PCT Application No. PCT/JP2021/005079 dated May 11, 2021 (four (4) pages).

Japanese-language International Preliminary Report on Patentability (PCT/IPEA/409) issued in PCT Application No. PCT/JP2021/005079 dated Oct. 29, 2021 including Annexes (eight (8) pages).

Extended European Search Report issued in Application No. 21764459.0 dated Mar. 26, 2024 (9 pages).

MASS SPECTROMETER

TECHNICAL FIELD

The present invention relates to a mass spectrometer.

BACKGROUND ART

A mass spectrometer is a device ionizing a sample and analyzing ions according to a mass-to-charge ratio. In general, a mass spectrometer includes an ion source ionizing a sample, a mass spectrometry unit separating the ions according to a mass-to-charge ratio, and a detection unit detecting a quantity of the ions having passed through the mass spectrometry unit.

As a technology on an ion guide separating ions and an air flow, there is the description of U.S. Pat. No. 8,581,182 (Patent Literature 1). In this gazette, there is described an ion guide separating ions and an air flow by that the ions are transferred from the first ion guide to the second ion guide by overriding a pseudopotential barrier between the first ion guide and the second ion guide by DC potential.

Also, there is the pamphlet of WO 2016/135810 (Patent Literature 2). In this gazette, there is described an ion guide in which two rod electrode sets forms a single multipole ion guide in a region where the two rod electrode sets overlap with each other in the longitudinal direction, ions are transferred to the first rod electrode set to the second rod electrode set by a DC potential difference between the first rod electrode set and the second rod electrode set in the overlapping region, and thereby ions and an air flow are separated from each other.

CITATION LIST

Patent Literature

[Patent Literature 1] Description of U.S. Pat. No. 8,581,182

[Patent Literature 2] Pamphlet of WO 2016/135810

SUMMARY OF INVENTION

Technical Problem

However, according to the prior arts, there was a problem that there was a limit in ion permeation efficiency.

As one of concrete configuration examples in prior arts, in Patent Literature 1, there is described an example of an aspect where an exhaust port is disposed on the center axis of the first ion guide, and an air flow having passed through the first ion guide is discharged. However, since the position of the exhaust port is limited, the diameter of the exhaust port is limited. When the diameter of the exhaust port is small, the discharge efficiency lowers, and the degree of vacuum of a space where the ion guide is disposed lowers. When the degree of vacuum is low, the mean free path of ions becomes small, and the ion permeation efficiency lowers.

Further, although another concrete configuration example in prior arts is described in Patent Literature 2, there is no description on control of an air flow after ions and the air flow are separated from each other in Patent Literature 2. According to the configuration of Patent Literature 2, there is a problem that a turbulent flow occurs by collision of an air flow on a wall surface of the vacuum chamber where the ion guide is disposed, ions and the sir flow are mixed, and thereby the ion permeation efficiency lowers.

The present invention has been achieved to solve such problem, and there is provided a mass spectrometer for higher ion permeation efficiency.

Solution to Problem

In an example of a mass spectrometer according to the present invention, an air flow including ions is separated into an air flow and an ion flow by an ion guide in the first vacuum chamber, and the first vacuum chamber includes a straightening member reducing mixing of the air flow and the ion flow having been separated from each other.

The present specification includes the content of disclosure of Japanese Patent Application No. 2020-038168 that becomes a basis of priority of the present application.

Advantageous Effects of Invention

According to a mass spectrometer according to the present invention, the ion permeation efficiency is improved.

DESCRIPTION OF EMBODIMENTS

Embodiments of the present invention will be hereinafter explained using the drawings.

Example 1

In the present example, a comparatively simple embodiment will be explained.

Figure 1:
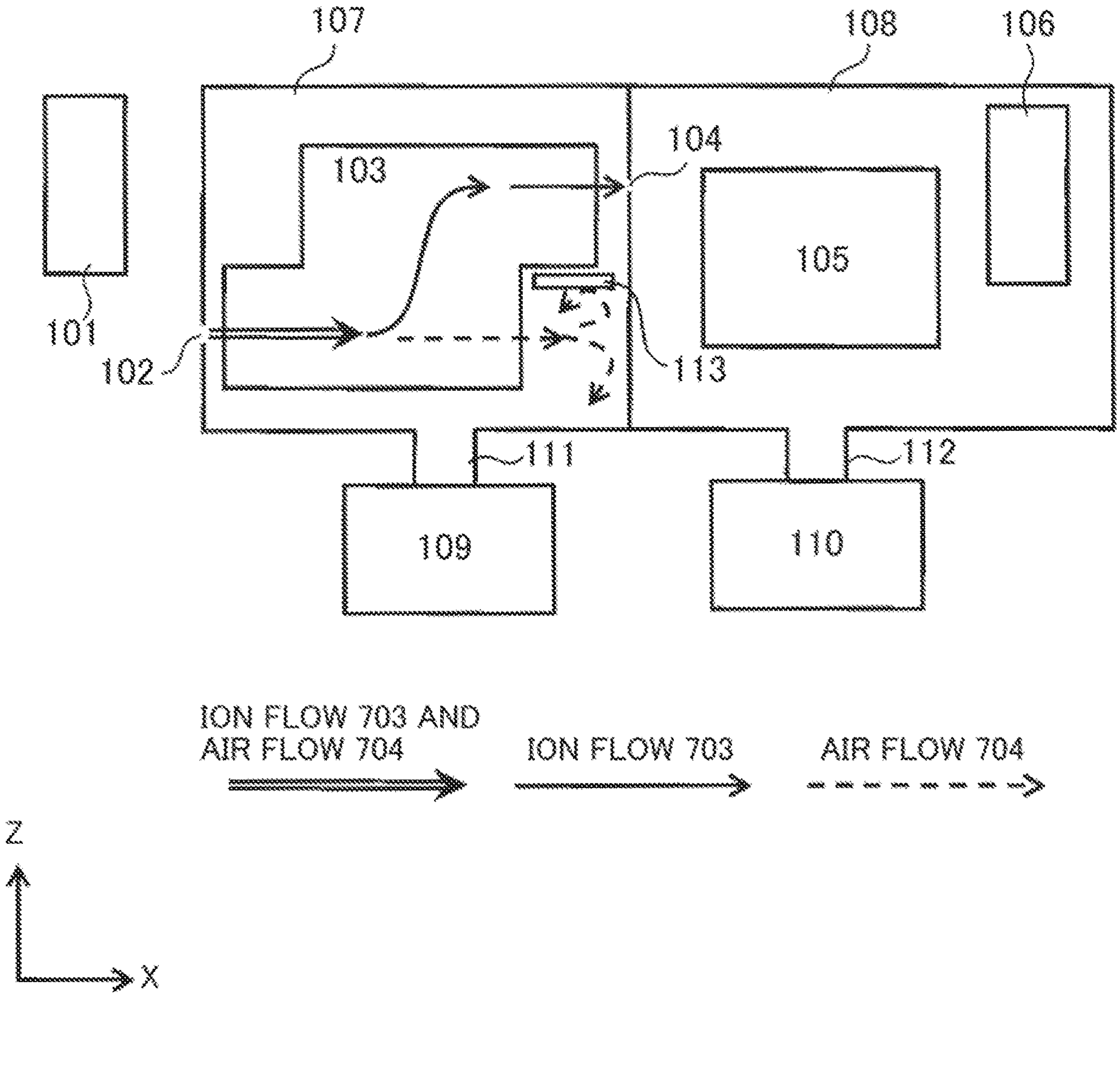
FIG. 1 is a configuration example of a mass spectrometer according to Example 1 of the present invention.

FIG. 1 is a view showing a configuration example of a mass spectrometer according to the present example. The mass spectrometer includes following configurations.

An ion source 101 ionizing a measurement sample

A pore 102 where ions generated in the ion source 101 pass through

An ion guide 103 where the ions having passed through the pore 102 pass through A pore 104 where the ions having passed through the ion guide 103 pass through A mass spectrometry unit 105 where the ions having passed through the pore 104 are analyzed A detector 106 (detection unit) where the ions having been analyzed by the mass spectrometry unit 105 are detected A first vacuum chamber 107 where the ion guide 103 is disposed, and the pore 102 and the pore 104 are provided A second vacuum chamber 108 where the mass spectrometry unit 105 is disposed, and the pore 104 is provided A vacuum pump 109 discharging the air in the first vacuum chamber 107

An exhaust port 111 connecting the first vacuum chamber 107 and the vacuum pump 109 to each other A vacuum pump 110 discharging the air in the second vacuum chamber 108

An exhaust port 112 connecting the second vacuum chamber 108 and the vacuum pump 110 to each other A current plate 113 (straightening member) disposed in the first vacuum chamber 107

In the ion source 101, a measurement sample is ionized by a method such as an electrospray ionization method, an atmospheric pressure chemical ionization method, an atmospheric pressure photoionization method, and a matrix-assisted laser desorption ionization method.

The ions generated in the ion source 101 enter the first vacuum chamber 107 through the pore 102. However, the concrete construction of the pore 102 can be designed optionally, may be one where a small hole is bored in a thin wall surface, and may be one like a fine tube where a small hole is bored in a thick wall surface for example.

It is also possible that an electrode and a vacuum chamber where ions pass though are provided before the first vacuum chamber 107.

Neutral molecules, the air, minute water drops and the like also enter the first vacuum chamber 107 the first vacuum chamber 107 through the pore 102 along with the ions. For the purpose of discrimination. A flow of ions reaching the pore 104 is defined to be an ion flow 703, and a flow of other than that is defined to be an air flow 704. In the air flow 704, not only the neutral molecules, the air, and the minute water drops described above but also a part of ions which cannot reach the pore 104 are included.

In the first vacuum chamber 107, there is disposed the ion guide 103 having a function of separating the ion flow 703 and the air flow 704 from each other. Also, the first vacuum chamber 107 includes the current plate 113. Actions of a mechanism and the current plate 113 will be described below, the mechanism being for separating the ion flow 703 and the air flow 704 from each other. The ion flow 703 separated from the air flow 704 by the ion guide 103 reaches the pore 104, and enters the second vacuum chamber 108.

The ion flow 703 having reached the pore 104 enters the second vacuum chamber 108. The second vacuum chamber 108 includes the mass spectrometry unit 105. In the mass spectrometry unit 105, the ions are separated according to the mass-to-charge ratio by an electrical and/or magnetic action. For example, there are a magnetic field type where the trajectory of the ion is bent by a magnetic field, a quadrupole type where ions are separated by applying a radio frequency voltage (RF voltage) or a direct current voltage (DC voltage) to an electrode whose section is a bipolar plane, a flying time type where ions are detected by difference of the flying time, and so on.

The ions having been analyzed by the mass spectrometry unit 105 are detected by the detector 106. In the detector 106, the ions are detected by converting an ion signal into an electric signal utilizing a photoelectron multiplier tube and an electron multiplier tube for example.

Thus, the mass spectrometer causes the ions generated by the ion source 101 to pass through the first vacuum chamber 107 and the second vacuum chamber 108, and transfers the same toward the detector 106.

The air in the first vacuum chamber 107 is discharged by the vacuum pump 109, and the air in the second vacuum chamber 108 is discharged by the vacuum pump 110. Although the first vacuum chamber 107 and the second vacuum chamber 108 communicate with each other by the pore 104, since the diameter of the pore 104 is limited, the first vacuum chamber 107 and the second vacuum chamber 108 are different from each other in terms of the pressure inside the chamber.

The first vacuum chamber 107 is close to the ion source 101 which is under the atmospheric pressure, and the pressure within the first vacuum chamber 107 is higher than the pressure within the second vacuum chamber 108. The vacuum pump 109 and the vacuum pump 110 may be of the same type. Also, the vacuum pump 109 and the vacuum pump 110 may be a single pump respectively, and may be a system obtained by combining plural kinds of pumps such as combined usage of a turbo-molecular pump and a dry pump for example.

The first vacuum chamber 107 and the vacuum pump 109 are connected to each other by the exhaust port 111, and the second vacuum chamber 108 and the vacuum pump 110 are connected to each other by the exhaust port 112. With respect to the exhaust port 111 and the exhaust port 112, as the diameter is larger, as there are less number of curves, and as the length to the vacuum pump 109 or the vacuum pump 110 is shorter, the exhaust efficiency is higher, and the pressure of the first vacuum chamber 107 and the second vacuum chamber 108 becomes lower. When the pressure of the first vacuum chamber 107 and the second vacuum chamber 108 is low, since the mean free path of ions becomes large, the permeation efficiency of the ion flow 703 becomes high.

A schematic drawing of the ion guide 103 is shown in FIG. 2. The ion guide 103 includes at least two electrode sets, and has a function of separating an air flow including ions introduced into the first vacuum chamber 107 from the ion source 101 into the ion flow 703 and the air flow 704.

Although a configuration example of the ion guide 103 will be hereinafter explained, the configuration of the ion guide 103 is not limited to it and can be designed or changed optionally based on a known technology. For example, a part of the configurations described in Patent Literature 1 or 2 may be applied. Also, with respect to a portion where description is omitted on the detail of the ion guide 103, description on Patent Literature 1 or 2 or other known technologies can be incorporated herein.

As the two electrode sets, in the X-axis direction, a first electrode set 201 is disposed on a side the ion flow 703 and the air flow 704 enter, and a second electrode set 202 is disposed on a side the ion flow 703 exits.

In FIG. 2 and other drawings, explanation will be made using an orthogonal 3-dimensional coordinate system including the X-coordinate, the Y-coordinate, and the Z-coordinate. The X-axis direction is the longitudinal direction of the first electrode set 201 and the second electrode set 202. Also, the X-axis direction corresponds to a direction along which the ions are transferred generally in each electrode set of the ion guide. The Z-axis direction corresponds to a direction along which the ion flow 703 is transferred from the first electrode set 201 to the second electrode set 202.

In FIG. 2, with respect to the ion guide 103, three regions divided in the X-axis direction are illustrated. The ion guide 103 includes a region 1, a region 2, and a region 3. The region 2 is a region where the first electrode set 201 and the second electrode set 202 overlap with each other in the X-axis direction. The regions 1 and 3 are regions where the first electrode set 201 and the second electrode set 202 do not overlap with each other in the X-axis direction.

Figure 2A:
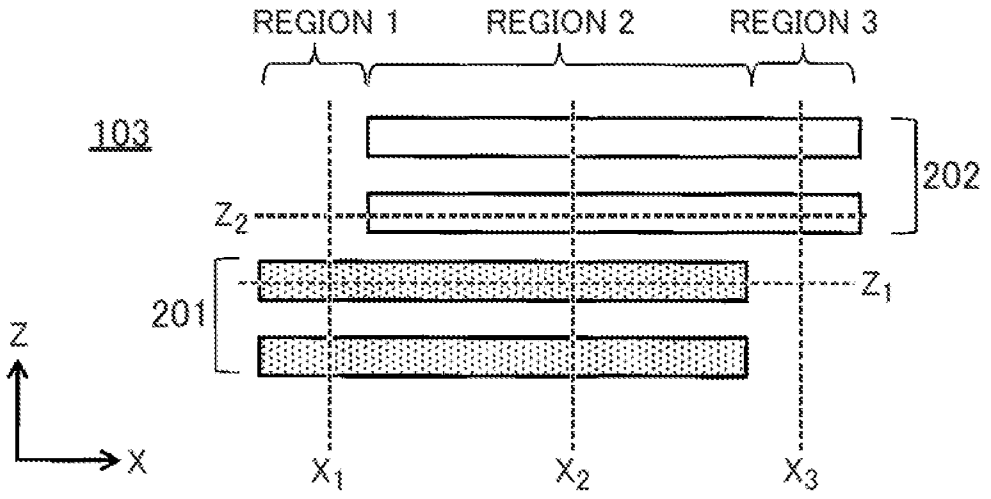
FIG. 2 is a configuration example of an ion guide to separate an ion flow and an air flow.
Figure 2B:
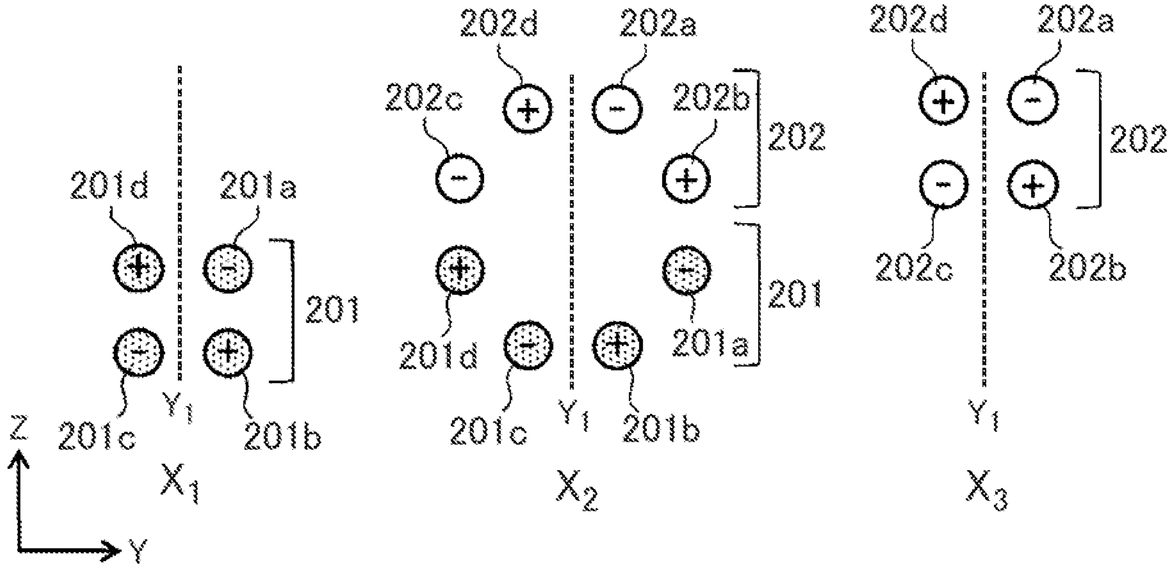
Figure 2C:
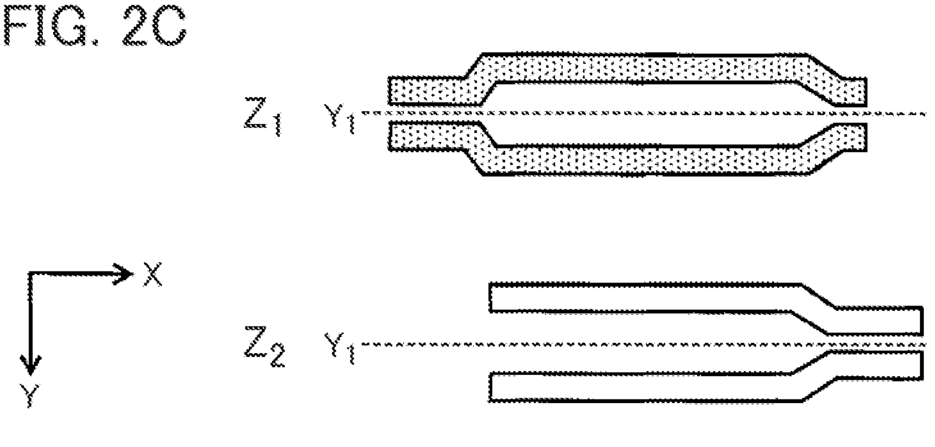

FIG. 2 is a configuration example of the ion guide 103 that can separate the ion flow 703 and the air flow 704 from each other. FIG. 2A is an X-Z plan view. FIG. 2B is a cross-sectional view by a plane perpendicular to the X-axis at positions X1, X2, and X3 in the X-axis direction in FIG. 2A. FIG. 2C is a cross-sectional view by a plane perpendicular to the Z-axis at positions Z1 and Z2 in the Z-axis direction in FIG. 2A.

The ion guide 103 shown in FIG. 2 includes the first electrode set 201 and the second electrode set 202, and is configured of a multipole including rod electrodes. The first electrode set 201 forms a quadrupole configured of rod electrodes in the region 1, and the second electrode set 202 forms a quadrupole configured of rod electrodes in the region 3. These rod electrodes are disposed at positions in the vicinity of apexes of a generally square in a Y-Z plane for example.

In an example of FIG. 2, in the region 2, a single octopole ion guide is formed so that four pieces in total of rods 201*a* and 201*d* adjacent to the second electrode set 202 in the first electrode set 201 and rods 202*b* and 202*c* adjacent to the first electrode set 201 in the second electrode set 202 are bent in the Y-axis direction so as to spread generally symmetrically with respect to the position Y1 in the Y-axis direction. Rod electrodes of the octopole are disposed at positions in the vicinity of apexes of a generally octagon in a Y-Z plane for example. Rods other than them namely rods 201*b*, 201*c*, 202*a*, and 202*d* are formed into a linear shape for example.

Also, the configuration of the rod electrode in the ion guide is not limited to it but can be designed optionally, and can be formed of even number of piece of the rod electrodes in each of the regions 1 to 3.

To the first electrode set 201 and the second electrode set 202, an RF voltage and an offset DC voltage are applied, and thereby the ion flow 703 and the air flow 704 are separated from each other.

Signs "+" and "−" shown in FIG. 2B show the phase of the RF voltage applied to each rod electrode. To a rod having the same sign, an RF voltage of the same frequency, the same amplitude, and the same phase is applied. To a rod having a different sign, an RF voltage of the same frequency, the same amplitude, and an opposite phase is applied.

In an example of FIG. 2B, since the rod 201*d* and the rod 202*c* become rod electrodes adjacent to each other in the region 2, an RF voltage having a phase opposite to each other is applied. In a similar manner, since the rod 201*a* and the rod 202*b* become rod electrodes adjacent to each other in the region 2, an RF voltage having a phase opposite to each other is applied.

FIG. 3 is a view showing pseudopotential formed by application of an optional RF voltage. The pseudopotential means potential imparting a force to ions on hourly average basis when an electric field fluctuating at a speed with which motion of the ions cannot follow sufficiently is applied.

Figure 3A:
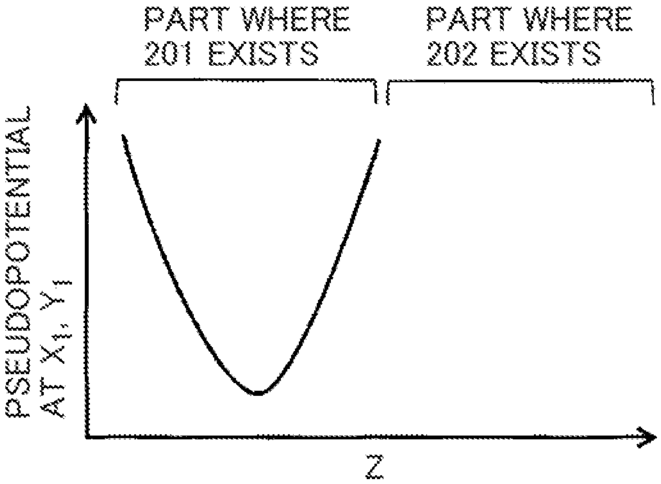
FIG. 3 is a view showing pseudopotential of an ion guide.
Figure 3B:
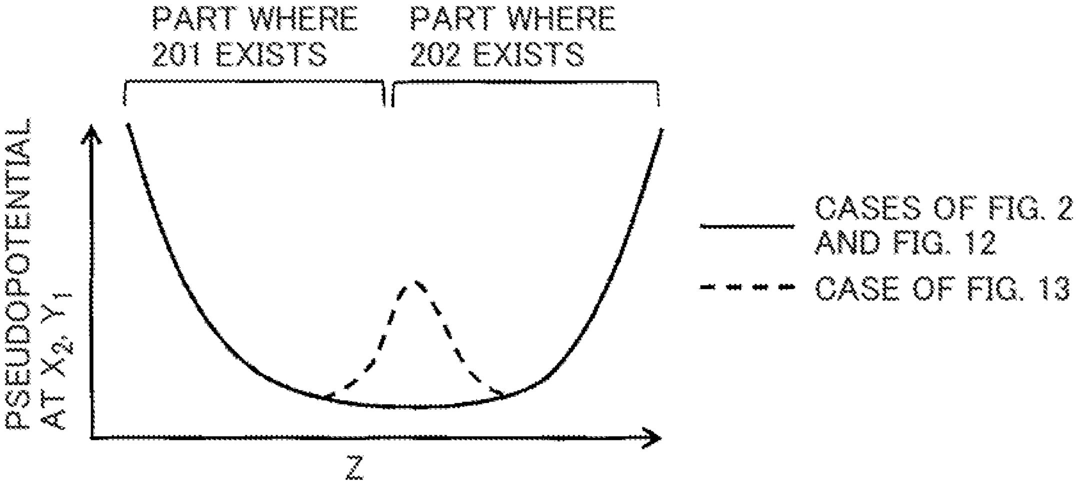
Figure 3C:
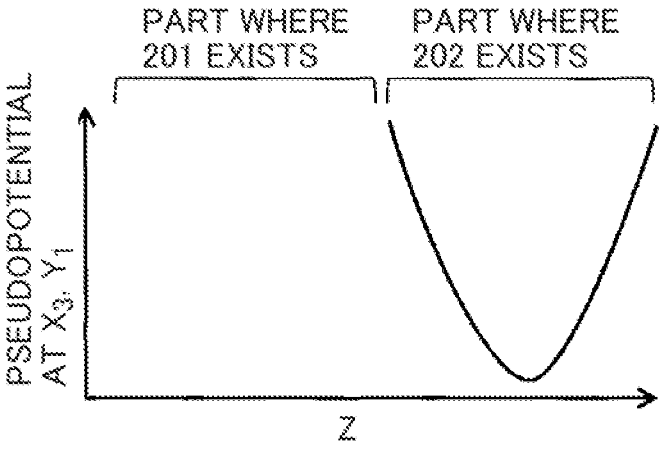

FIG. 3A shows the height of the pseudopotential at a position (X1, Y1). FIG. 3B shows the height of the pseudopotential at a position (X2, Y1) (also, in the present example, the electrode configuration is as per FIG. 2, and the height of the pseudopotential is shown by a solid line). FIG. 3C shows the height of the pseudopotential at a position (X3, Y1).

In the ion guide 103 having the configuration of FIG. 2, a local minimum point of the pseudopotential exists on the Y-Z plane, and ions are basically converged onto this local minimum point, and proceed within the electrode. The local minimum point of the pseudopotential is hereinafter defined to be the center of the electrode. The center of the electrode is defined as a straight line extending in the X-axis direction for example, and configures the axis (the center axis).

In the region 1, when ions within a specific mass-to-charge ratio range enter a portion where the first electrode set 201 is disposed, the ions are converged and proceed toward the center of the first electrode set 201. The mass-to-charge ratio range where convergence takes place is determined depending on the frequency and the amplitude of the RF voltage to be applied. Therefore, it is required to adjust the frequency and the amplitude of the RF voltage by the mass-to-charge ratio of the ions which are intended to reach the pore 104.

In the region 2, there is no barrier of the pseudopotential between the first electrode set 201 and the second electrode set 202. That is to say, the ion guide 103 forms a single ion guide in the region 2. Therefore, the ions can go back and forth freely between the first electrode set 201 and the second electrode set 202. Also, since it is not required to impart the ions with strong energy to override a potential barrier, the quantity of ions passing through the center axis of the second electrode set 202 and flying out to the opposite side can be reduced.

In the region 3, similarly to the region 1, when ions within a specific mass-to-charge ratio range enter a portion where the second electrode set 202 is disposed, the ions proceed while being converged toward the center of the second electrode set 202.

Also, to the first electrode set 201 and the second electrode set 202, an offset DC voltage of electric potential different from each other is applied. At this time, when the positive ions are intended to pass to the pore 104, a voltage lower than that of the second electrode set 202 is applied to the second electrode set 202, whereas when the negative ions are intended to pass to the pore 104, a voltage higher than that of the second electrode set 202 is applied to the second electrode set 202.

Further, from now on, although there is a case of giving explanation where the magnitude relation ship of the electric potential is limited to a case of separating the positive ions, the explanation is applicable to a case of separating the negative ions if the magnitude relation ship of the electric potential is reversed.

Figure 4:
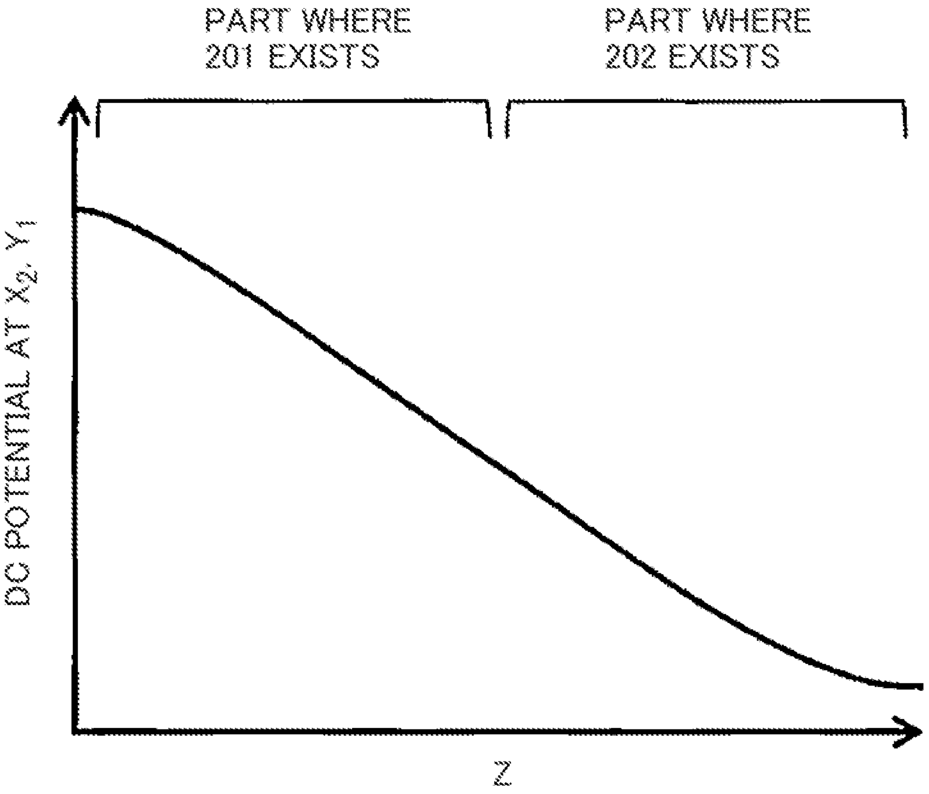
FIG. 4 is a view showing DC potential in a region 2 of an ion guide.

FIG. 4 shows the height of DC potential at a position (X2, Y1) formed by application of the offset DC voltage. The potential becomes low as the Z-coordinate is larger, namely the potential becomes low toward the side of the second electrode set 202. The off set DC voltage applied to each rod can be designed optionally with a provision that the DC potential curve becomes monotonic decreasing.

When the off set DC voltage applied to each electrode is changed and the DC potential gradient is changed, the permeation efficiency of the ion flow 703 changes. This occurs by a cause that, for example, when the DC potential gradient is large, the kinetic energy of the ions becomes large, and the convergence efficiency of the ion flow 703 drops in the second electrode set 202. Therefore, in a similar manner to the RF voltage, it is required to adjust the DC potential gradient according to the mass-to-charge ratio of the ions which are intended to permeate through to the pore 104.

Figure 5:
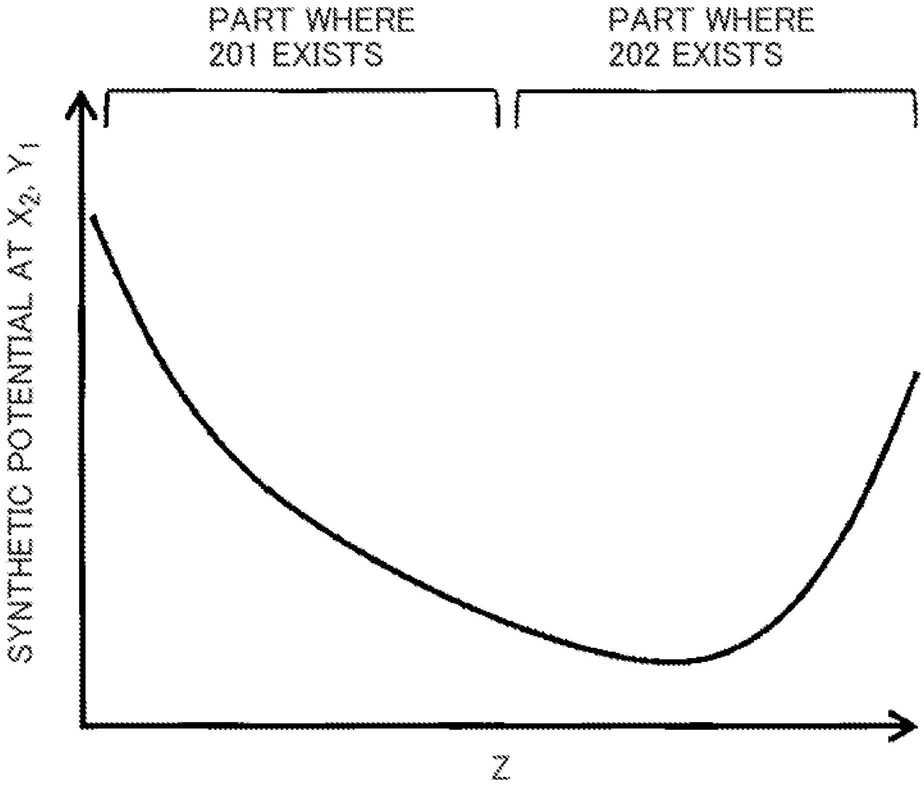
FIG. 5 is a view showing synthetic potential of pseudopotential and DC potential in a region 2 of an ion guide.

FIG. 5 shows the height of the potential (synthetic potential) obtained by synthesizing the pseudopotential and the DC potential at a position (X2, Y1). By combination of the RF voltage and the off set DC voltage, the ions move irreversibly from the center of the first electrode set 201 toward the center of the second electrode set 202. Thus, the ion guide 103 forms electric potential that causes the ions having entered the first electrode set 201 to move from the first electrode set 201 to the second electrode set 202 in the region 2.

When an ion incidence point of the first electrode set 201 is located within a range of several millimeters from the pore 102, the convergence efficiency of the ion becomes high which is preferable. Here, “ion incidence point” means for example the center of the first electrode set 201 at the incident side end in the X-axis direction of the first electrode set 201. The distance (distance in the three-dimensional space) of the ion incidence point from the pore 102 can be made 5 mm, 1 cm, 2 cm, and the like for example.

Also, it is preferable when the center of the second electrode set 202 is disposed at a position getting into alignment (so as to be generally coaxial for example) with the pore 104 at least at an exit side end in the X-axis direction of the second electrode set 202. Also, when an ion exit point of the second electrode set 202 is located within a range of several millimeters from the pore 104, the convergence efficiency of the ion becomes high which is preferable. Here, “ion exit point” means for example the center of the second electrode set 202 at the exit side end in the X-axis direction of the second electrode set 202. The distance (distance in the three-dimensional space) of the ion exit point from the pore 104 can be made 5 mm, 1 cm, 2 cm, and the like for example.

Figure 6:
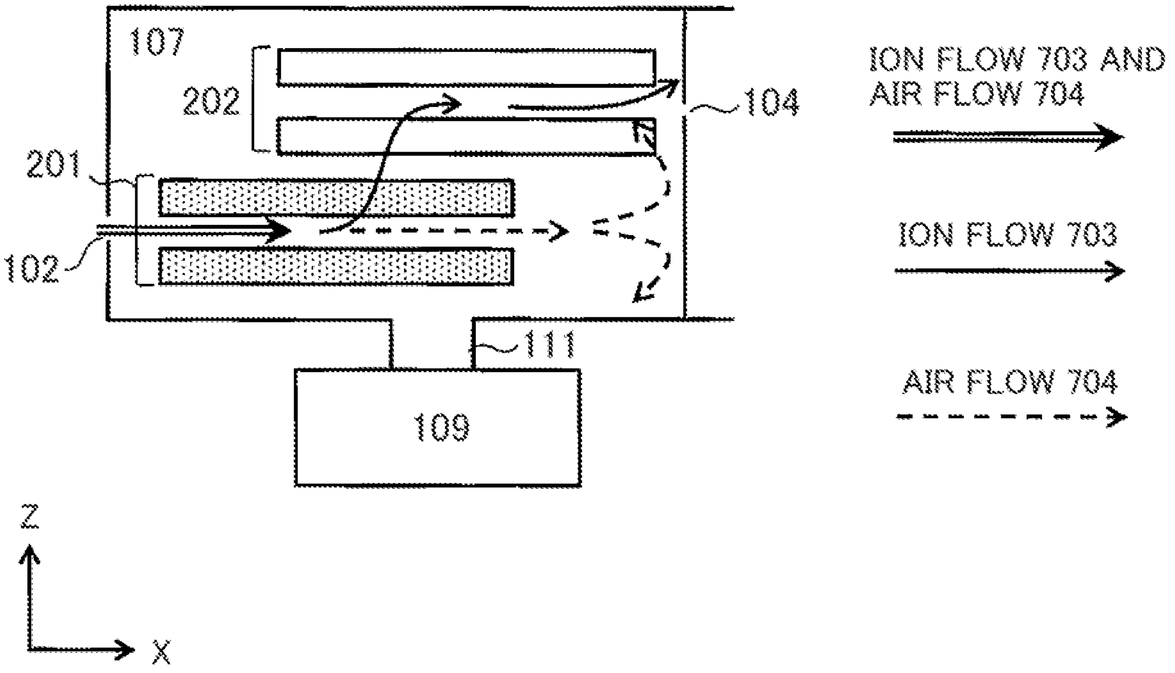
FIG. 6 is a view showing a situation of an ion flow and an air flow passing through an ion guide not having a current plate as a comparative example.
Figure 7:
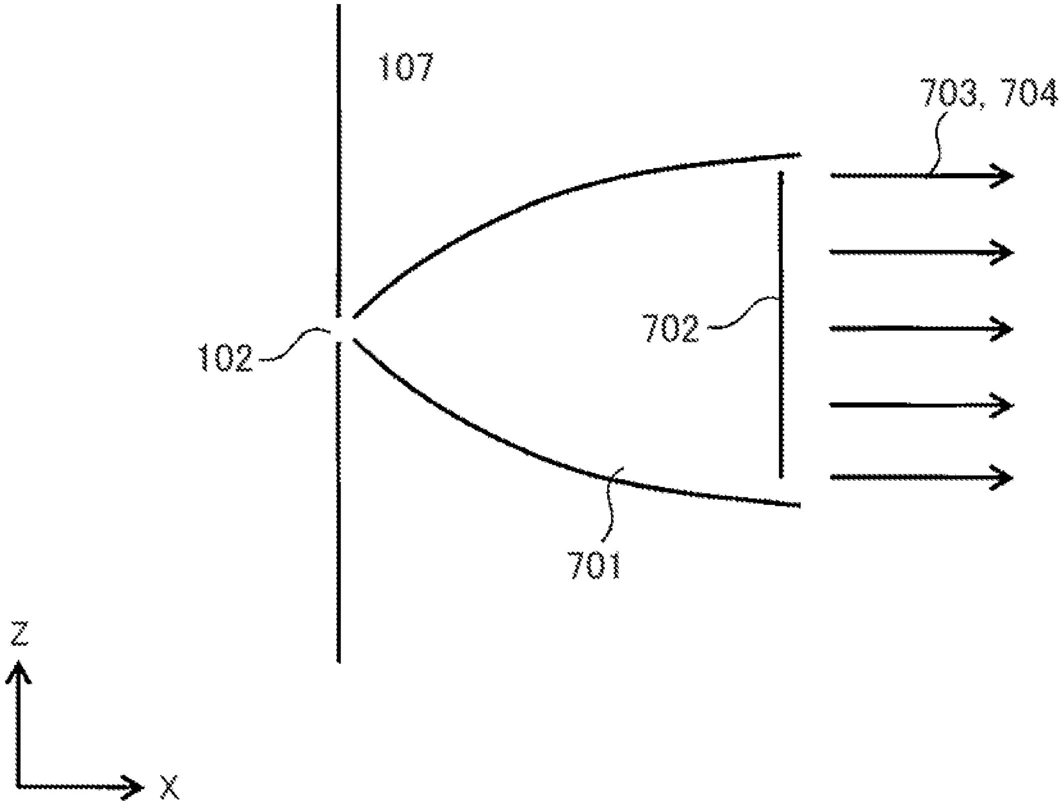
FIG. 7 is a view showing a situation of an ion flow and an air flow incident on a first vacuum chamber.

Here, as a comparative example for explaining an action of the present invention, movement of the ion flow 703 and the air flow 704 within the first vacuum chamber 107 when the ion guide 103 of FIG. 2 is used is shown in FIG. 6. Also, a detailed situation of the vicinity of the pore 102 is shown in FIG. 7 (this drawing is applicable to the example 1 of the present invention and to a comparative example in a similar manner).

Since there is a pressure difference before and after the pore 102, a barrel shock 701 and a Mach disk 702 are formed. By this impact, immediately after passing through the pore 102, the ion flow 703 and the air flow 704 proceed within the first vacuum chamber 107 with a diameter generally the same as that of the Mach disk 702. The diameter of the Mach disk 702 is determined depending on the diameter of the pore 102 and the pressure before and after the pore 102.

The ion flow 703 having diffused at the time of entering the pore 102 is converged to the center of the first electrode set 201 by the action of the RF voltage described above, and proceeds within the first electrode set 201. When the ion flow 703 reaches the region 2, the ion flow 703 moves from the vicinity of the center of the first electrode set 201 to the center of the second electrode set 202 by the action of the offset DC voltage described above, and proceeds straight toward the pore 104 near the center of the second electrode set 202.

On the other hand, since a substance such as the neutral molecule hardly receiving an electrical action gets mixed much into the air flow 704, the air flow 704 passes the vicinity of the first electrode set 201 with a diameter generally the same as that of the Mach disk 702. However, different from the ion flow 703, the air flow 704 hardly moves toward the second electrode set 202. By such mechanism, the ion flow 703 and the air flow 704 are separated from each other in the ion guide 103.

In the comparative example of FIG. 6, since there does not exist the current plate 113 according to the example 1, the air flow 704 collides on a wall surface partitioning the first vacuum chamber 107 and the second vacuum chamber 108, and a turbulent flow of the air flow 704 is generated. Since this turbulent flow is mixed with the ion flow 703 and the mean free path of the ion becomes small, the permeation efficiency of the pore 104 of the ion flow 703 drops, and the ion signal becomes unstable.

Figure 8A:
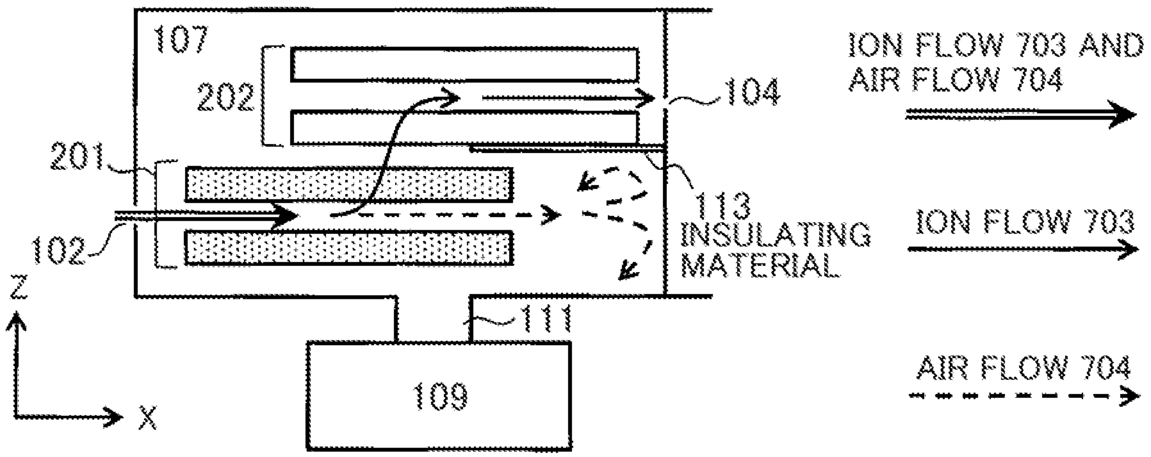
FIG. 8 is a view showing a situation of an ion flow and an air flow passing through an ion guide having a current plate.
Figure 8B:
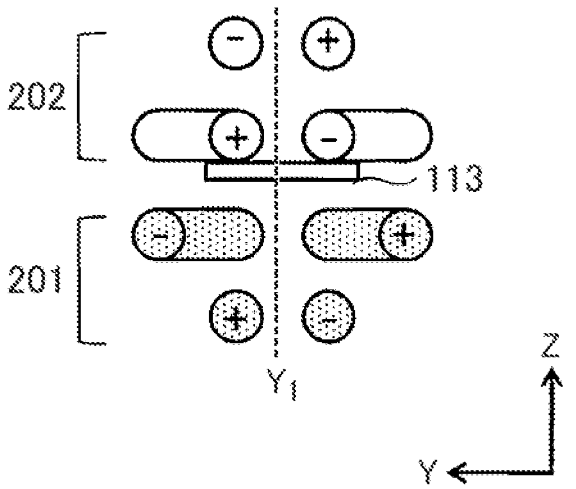

An example of an aspect of the current plate 113 according to the example 1 of the present invention and the situation of the movement of the ion flow 703 and the air flow 704 when the current plate 113 is utilized are shown in FIG. 8. FIG. 8A is an X-Z plan view, and FIG. 8B is a Y-Z plan view when the ion guide 103 is viewed from the pore 104.

Although the shape of the current plate 113 is optional, it is a rectangular parallelepiped according to the present example, and is of a plate-like shape where the length in the X-axis direction (thickness) is small and the area of the X-Y plane is large. With such shape, manufacturing is easy. The thickness of the current plate 113 can be made 3 mm for example. The length in the X-axis direction of the current plate 113 can be made for example a length from a point where the ion flow 703 and the air flow 704 are separated from each other in the region 2 to the pore 104. The point where the ion flow 703 and the air flow 704 are separated from each other in the region 2 can be decided for example by a person with an ordinary skill in the art by an experiment and the like.

As another example, the length in the X-axis direction of the current plate 113 can be made such length that the current plate 113 does not cover the region 2 but covers only the region 3. Also, the entirety of the current plate 113 does not have to be of a flat surface shape, and a part or the entirety of the current plate 113 may be curved.

Also, in an example of FIG. 8, the current plate 113 is in contact with a wall surface of the exit side end of the first vacuum chamber 107. Although such configuration is preferable in terms that the separation efficiency of the ion flow 703 and the air flow 704 becomes high, a configuration where the current plate 113 is not in contact with a wall surface is also possible.

Although the length in the Y-axis direction of the current plate 113 can be designed appropriately by a person with an ordinary skill in the art, it is the same or generally the same as the diameter of the quadrupole of the second electrode set 202 in the example of FIG. 8. As a modification, the length in the Y-axis direction of the current plate 113 may be made to be the same length as the diameter of the octopole formed in the region 2, and may be made a length longer than that.

In order to prevent electric discharge from each electrode of the ion guide 103, it is preferable that the current plate 113 is configured of an insulating material. For example, a resin material such as PEEK and a ceramic material such as alumina can be used.

At least a part of the current plate 113 is disposed between the center axis of the first electrode set 201 and the center axis of the second electrode set 202 in the Z-coordinate (so as to become parallel to each center axis for example). Thus, the ion flow 703 and the air flow 704 can be separated from each other efficiently.

In the current plate 113, a plane having the largest area may be disposed to become parallel to the X-Y plane. The position of the current plate 113 in the Z-axis direction is preferable to be close to the second electrode set 202 in terms that the separation efficiency of the ion flow 703 and the air flow 704 becomes higher, and the current plate 113 may be configured to be in contact with the second electrode set 202 as shown in FIG. 8 for example.

In the X-axis direction, the current plate 113 can be disposed at various positions according to the length of the current plate 113. For example, in the example of FIG. 8, in a region after the ion flow 703 and the air flow 704 are separated from each other, the current plate 113 is disposed to be along the second electrode set 202. Alternatively, for example, in a region after the ion flow 703 and the air flow 704 are separated from each other, the current plate 113 may be disposed to cover a range up to the pore 104. In this case, the current plate 113 may be in contact with a wall surface where the pore 104 is formed (namely a wall surface partitioning the first vacuum chamber 107 and the second vacuum chamber 108 (shown in FIG. 8), and may not.

In the Y-axis direction, the current plate 113 is disposed to become symmetric with respect to a position Y1 in the Y-axis direction in an example of FIG. 8B.

The current plate 113 reduces mixing of the air flow 704 and the ion flow 703 having been separated. For example, when the current plate 113 is disposed as FIG. 8, even when the air flow 704 may collide on a wall surface partitioning the first vacuum chamber 107 and the second vacuum chamber 108, mixing with the ion flow 703 can be reduced. Therefore, the mean free path of the ion flow 703 becomes large, and efficiency of permeation of the ion flow 703 through the pore 104 becomes high. Also, the ion signal becomes more stable.

Further, when the exhaust port 111 is disposed to be on the first electrode set 201 side with respect to the second electrode set 202 in a position in the Z-axis direction, the air flow 704 can be removed more efficiently, and an effect secured becomes large. However, the position of the exhaust port 111 is not required to be disposed strictly, and therefore can be designed freely.

As described above, according to the present example, the configuration of each rod and the current plate 113 is comparatively simple, therefore manufacturing for example is easy, however, modifications as respective examples described below are also possible.

Example 2

In the present example, an example of the current plate 113 with an aspect different from Example 1 will be explained.

Figure 9A:
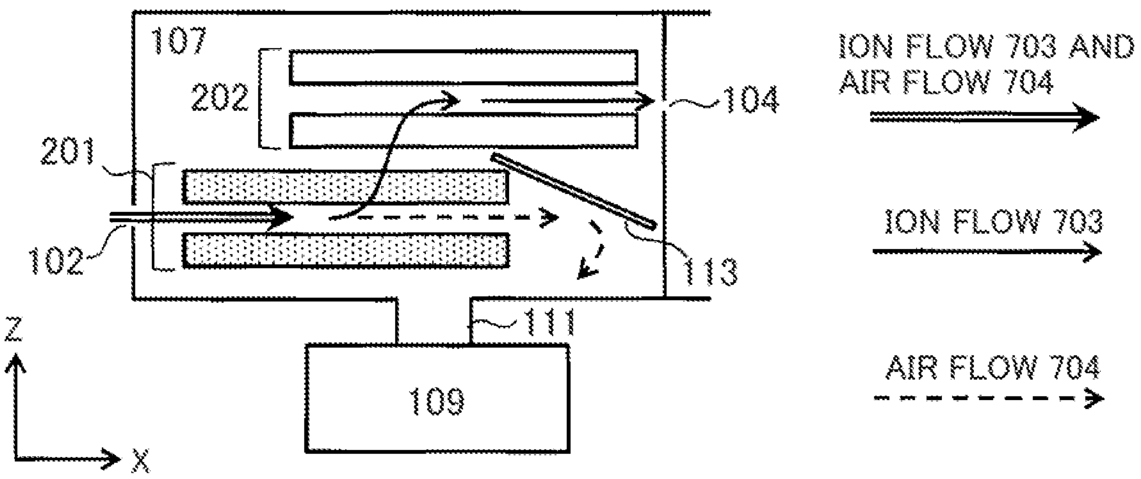
FIG. 9 is a configuration example of a current plate according to Example 2 of the present invention.
Figure 9B:
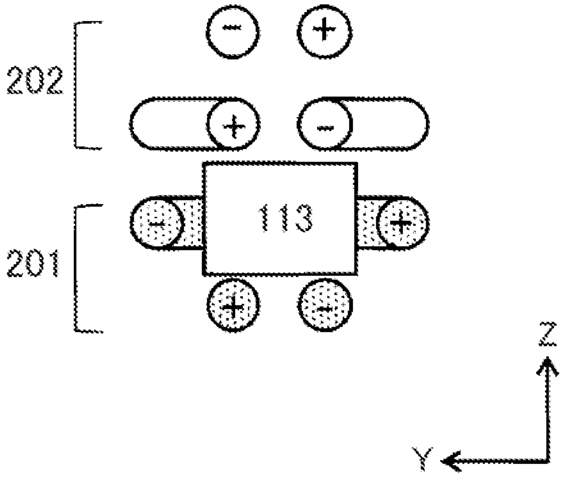

FIG. 9 shows a configuration example of the current plate 113 according to Example 2. This is an example where the current plate 113 having a shape similar to that of Example 1 is used in a layout different from that of Example 1.

The shape and the raw material of the current plate 113 can be made to be similar to those of Example 1. In the example of FIG. 9, the position of the current plate 113 in the X-axis direction and the Y-axis direction is similar to that of FIG. 8.

The position in the Z-axis direction of the incident side end (namely an end becoming the region 1 side in the X-axis direction) of the current plate 113 is located between the center axis of the first electrode set 201 and the center axis of the second electrode set 202, and the position in the Z-axis direction of the exit side end (namely an end becoming the pore 104 side in the X-axis direction) of the current plate 113 is located on the Z-axis minus side, namely the exhaust port 111 side of the incident side end. Therefore, in the example of FIG. 9, a surface of the current plate 113 having the largest area has an inclination with respect to the X-Y plane.

With such inclined layout, the air flow 704 collides on the current plate 113. Since the air flow 704 after collision proceeds toward the exhaust port 111 in FIG. 9, the air flow 704 can be discharged more efficiently.

Example 3

In the present example, an example of the current plate 113 with an aspect different from Example 1 and Example 2 will be explained.

Figure 10A:
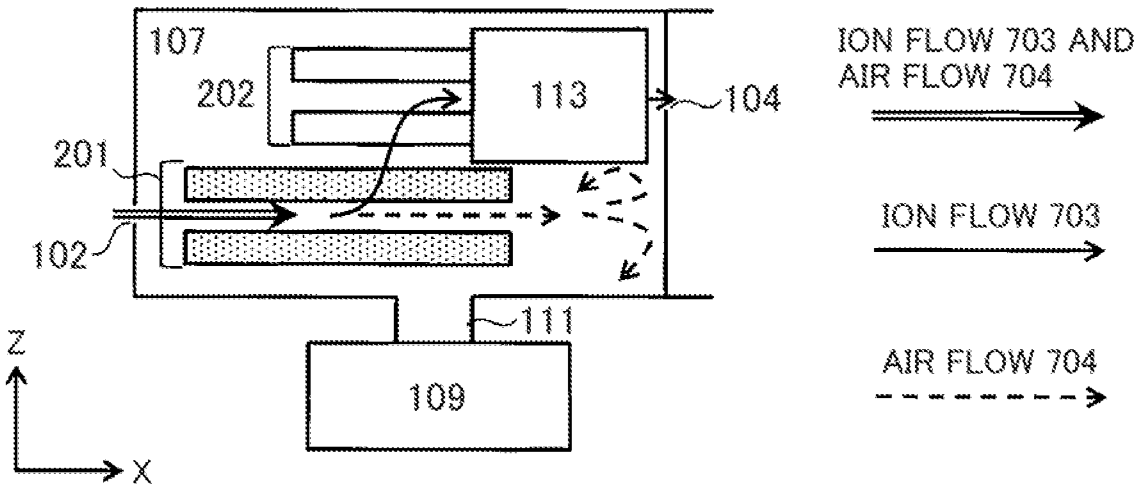
FIG. 10 is a configuration example of a current plate according to Example 3 of the present invention.
Figure 10B:
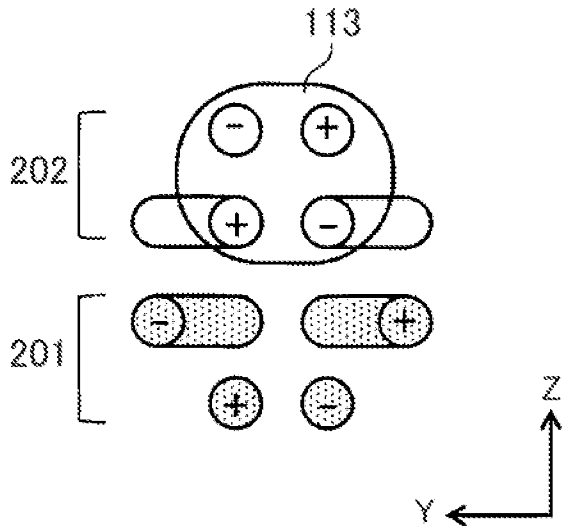

FIG. 10 shows a configuration example of the current plate 113 according to Example 3. In the example of FIG. 10, the current plate 113 has a tubular shape extending in the X-axis direction, and both ends thereof open. The raw material of the current plate 113 is similar to that of Examples described above. The position in the X-axis direction of this current plate 113 having the tubular shape can be made similar to that of FIG. 8 and FIG. 9.

The cross-sectional shape of the current plate 113 can be designed optionally as long as it is a closed figure and is for example a circle (in this case, the current plate 113 is of a cylindrical shape), an ellipse, or a polygon, and at least the diameter of a hollow portion of the tube only has to be larger than the diameter of the second electrode set 202.

This current plate 113 having the tubular shape can be disposed to cover the second electrode set 202 in a region after the ion flow 703 and the air flow 704 have been separated from each other. This current plate 113 having the tubular shape may be in contact with the pore 104, and may be in contact with the second electrode set 202.

Thus, when the current plate 113 having a tubular shape is used, since the region 3 of the second electrode set 202 is protected by 360 degrees in the Y-Z plane, mixing of the turbulent flow generated by the air flow 704 and the ion flow 703 can be reduced further.

Example 4

In the present example, an example of the current plate 113 with an aspect different from Example 1, Example 2, and Example 3 will be explained.

Figure 11A:
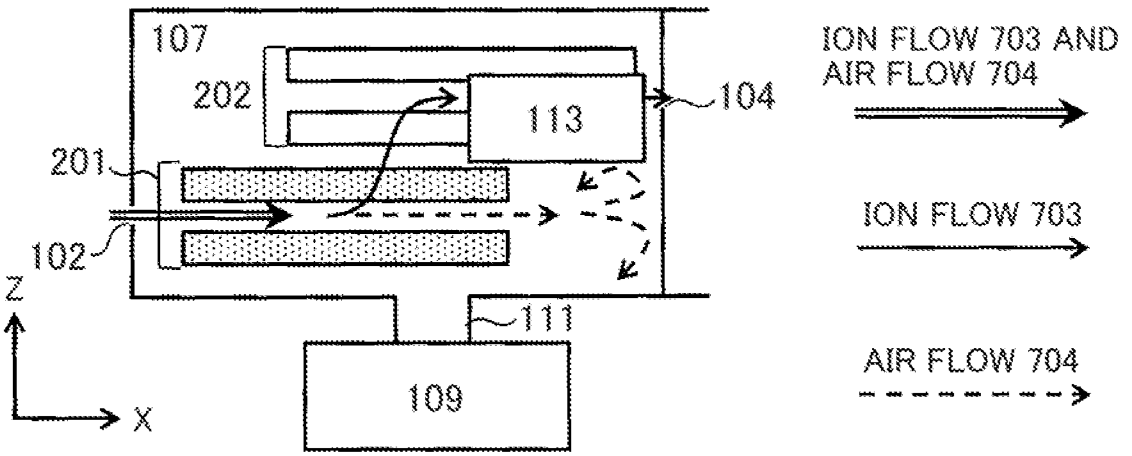
FIG. 11 is a configuration example of a current plate according to Example 4 of the present invention.
Figure 11B:
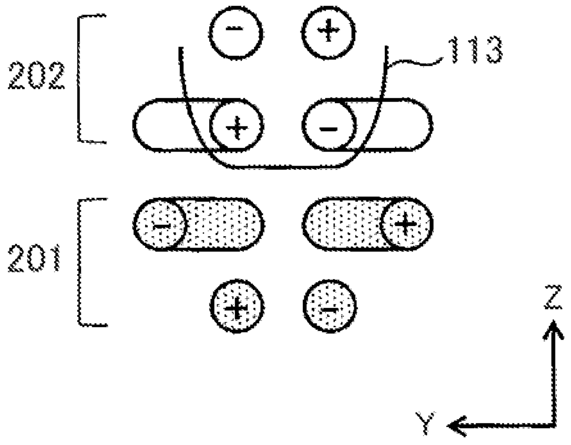

FIG. 11 shows a configuration example of the current plate 113 according to Example 4. FIG. 11 shows an example of the current plate 113 having a curved surface. This shape is a shape obtained by removing a part of the tube from the current plate 113 of FIG. 10, and the raw material can be made similar to that of Examples described above.

The shape of the current plate 113 may be a shape where a part of a surface of a polyhedron is lacking.

Although the disposal position is similar to that of the current plate 113 of FIG. 10, the current plate 113 is disposed so that there exists a surface between the center axis of the first electrode set 201 and the center axis of the second electrode set 202.

In Example 4, it is possible that both ends of the current plate 113 extend to the side of the ion flow 703 instead of the air flow 704 in a cross section (for example a cross section shown in FIG. 1B) cut by a plane perpendicular to the center axis of the second electrode set 202. Also, in an example of FIG. 11B, a part of the current plate 113 forms a flat surface namely a part of the cross section has a linear shape, however, the entirety of the current plate 113 may be curved, namely the entirety of the cross section may have a curved shape.

According to the present example, the degree of mixing of the ion flow 703 and the air flow 704 is lower compared to Example 1 and Example 2, and is higher compared to Example 3. Further, although the degree of mixing becomes higher compared to Example 3, the consumption amount of the raw material for manufacturing the current plate 113 is less. Therefore, a balance of the manufacturing cost of the apparatus and the effect secured can be selected.

Example 5

In the present example, an example of using the ion guide 103 with an aspect different from Example 1 will be explained.

Figure 12A:
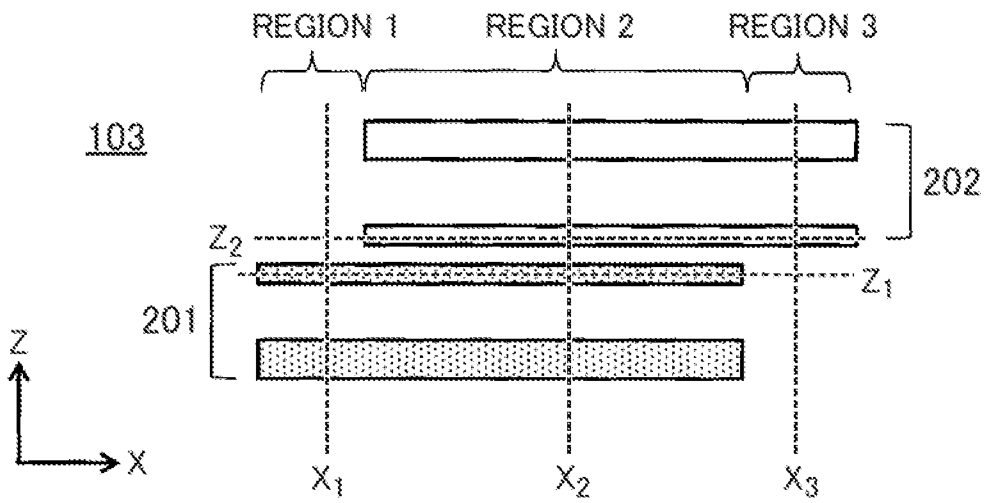
FIG. 12 is a configuration example of an ion guide to separate an ion flow and an air flow according to Example 5 of the present invention.
Figure 12B:
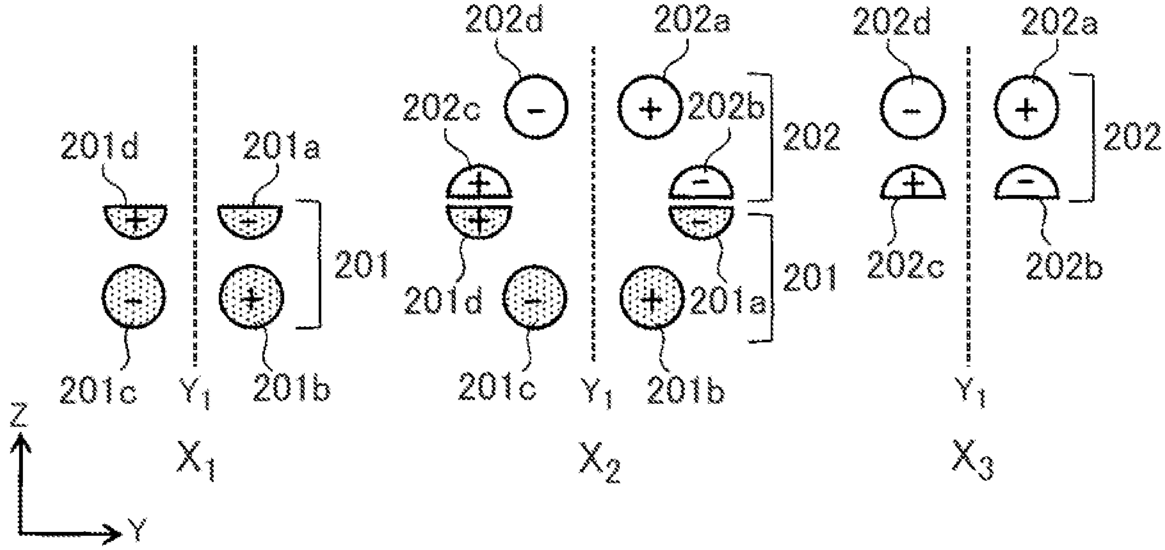
Figure 12C:
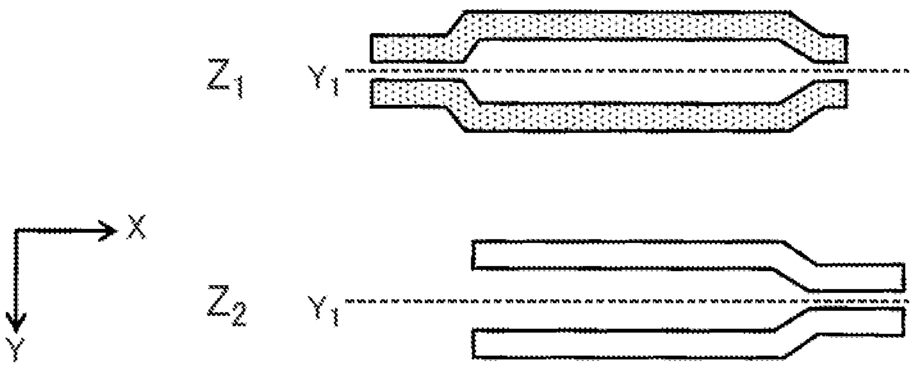

FIG. 12 shows a configuration example of the ion guide 103 according to Example 5. The ion guide 103 includes the first electrode set 201 and the second electrode set 202. In a similar manner to Example 1, each of the first electrode set 201 and the second electrode set 202 forms a quadrupole by rod electrodes.

The present example is different from Example 1 in terms that the cross section of a part of these rod electrodes is a semicircle. The electrode of the semicircle is the two rods 201*a* and 201*d* close to the second electrode set 202 with respect to the first electrode set 201, and the two rods 202*b* and 202*c* close to the first electrode set 201 with respect to the second electrode set 202. The cross section of the rod other than them has a circular shape.

In the region 2, the rods 201*d* and 202*c* are adjacent to each other, and are arranged to configure a cross-sectional view approximating a semicircle. In a similar manner, the rods 201*a* and 202*b* are adjacent to each other, and are arranged to configure a cross-sectional view approximating a semicircle. The distance between the rods 201*d* and 202*c* can be made within a range of 0.1 mm to 2 mm, or approximately 0.1 mm to 2 mm. The same is applicable also to the distance between the rods 201*a* and 202*b*.

With such disposal, a rod set including the rods 201*d* and 202*c* can be regarded to be one rod electrode in the region 2. The same is applicable also to a rod set including the rods 201*a* and 202*b*.

Therefore, in the region 2, the ion guide 103 is configured of a hexapole by six electrodes in total of the rod 201*b*, the rod 201*c*, the rod 202*a*, the rod 202*b*, a rod set including the rods 201*d* and 202*c*, and a rod set including the rods 201*a* and 202*b*.

In the example of FIG. 12, in the region 2, so that the hexapole is disposed on the apexes of a generally regular hexagon, four in total of the rods 201*d* and 202*c* and the rods 201*a* and 202*b* are bent in the Y-axis direction so as to spread generally symmetrically with respect to a position Y1 in the Y-axis direction. The rods other than them namely the rods 201*b*, 201*c*, 202*a*, and 202*d* are formed into a linear shape for example.

In a similar manner to Example 1, with respect to the number of piece of the rod electrode in the first electrode set 201, the number of piece of the rod electrode in the second electrode set 202, and the number of piece of the rod electrode in an electrode formed by combination of the first electrode set 201 and the second electrode set 202 in the region 2, the number of piece is no object as long as it is a multipole formed of only the rod electrodes of even number of piece.

Although the RF voltage and the DC voltage applied to the electrode are similar to those of Example 1, since each of the rods 201*d* and 202*c* is regarded to be one pole in the region 2, the RF voltage with the same phase, the same frequency, and the same amplitude is applied to these rods. However, with respect to the DC voltage, it is not required to be equalized in these rods. The same is applicable also to the rods 201*a* and 202*b*.

The principle in separating the ion flow 703 and the air flow 704 from each other by the ion guide 103 is similar to that of Example 1.

Example 6

In the present example, an example of using the ion guide 103 with an aspect different from Example 1 and Example 5 will be explained.

Figure 13A:
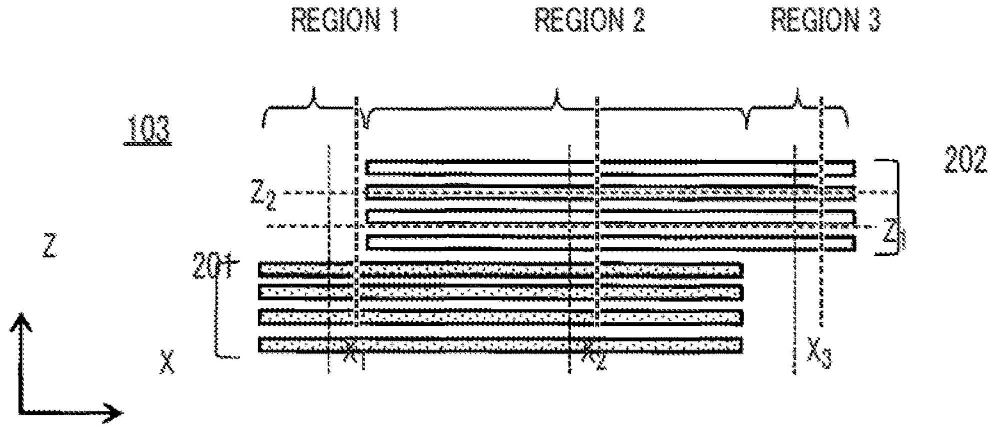
FIG. 13 is a configuration example of an ion guide to separate an ion flow and an air flow according to Example 6 of the present invention.
Figure 13B:
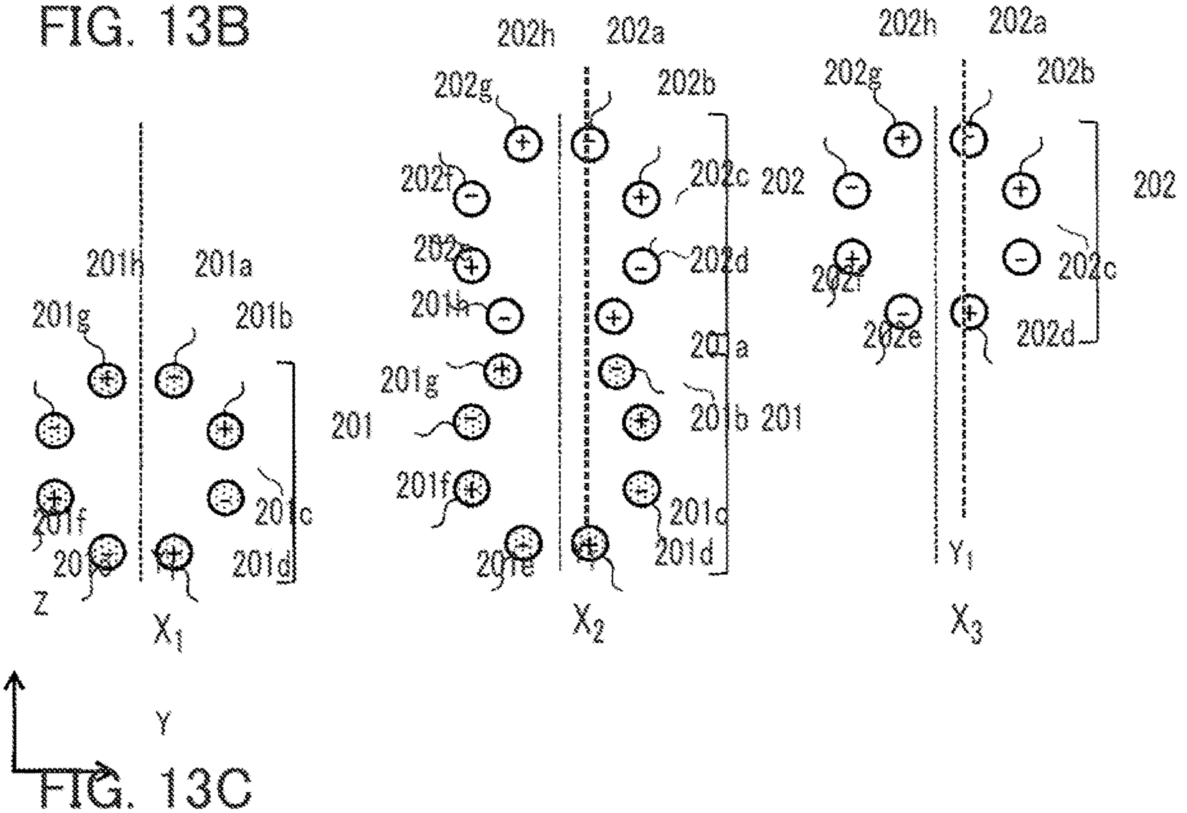
Figure 13C:
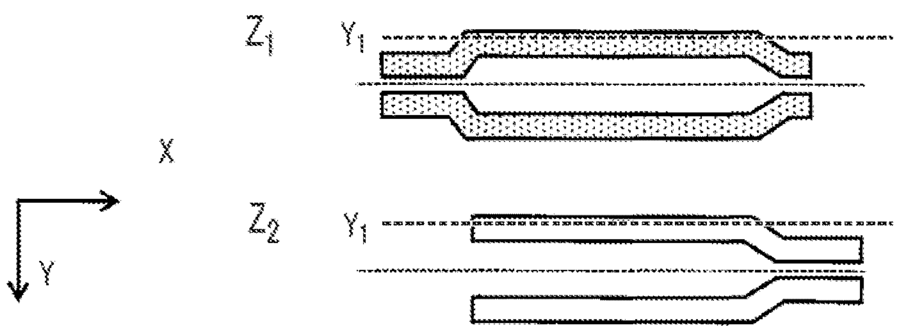

FIG. 13 shows a configuration example of the ion guide 103 according to Example 6. The ion guide 103 includes the first electrode set 201 and the second electrode set 202. In an example of FIG. 13, each of the first electrode set 201 and the second electrode set 202 forms an octopole by the rod electrodes.

In the region 2, four pieces in total of the rods 201*a*, 201*h*, 202*d*, and 202*e* are bent in the Y-axis direction so as to spread generally symmetrically with respect to a position Y1 in the Y-axis direction. The cross-sectional view of the region 2 in the present example has a shape like an ellipse generally having a “constriction”. The rods other than them namely the rods 201*b* to 201*g*, 202*a* to 202*c*, and 202*f* to 202*h* are formed into a linear shape for example.

With respect to all of the number of piece of the rod electrode in the first electrode set 201, the number of piece of the rod electrode in the second electrode set 202, and the number of piece of the rod electrode in a portion where there exists a “constriction” formed by combination of the first electrode set 201 and the second electrode set 202 in the region 2, the number of piece is no object as long as it is a multipole formed of the rod electrodes of even number of piece.

The voltage applied to each rod can be made similar to that of Example 1 or Example 5. However, in the region 2, since there exists a “constriction” described above, the situation of the pseudopotential is different from that of Example 1 and Example 5. An example of the pseudopotential in the present example is shown in FIG. 3.

A portion shown by a broken line in FIG. 3B is a portion corresponding to the present example, and is different from Example 1 and Example 5. According to the present example (the disposal of FIG. 13), in the region 2, the ion guide 103 includes a potential barrier of the pseudopotential between the first electrode set 201 and the second electrode set 202.

Ions can override this pseudopotential barrier by enlarging the DC potential difference between the first electrode set 201 and the second electrode set 202. Due to presence of the pseudopotential barrier, the ion flow 703 is converged into the second electrode set 202 more strongly after moving to the second electrode set 202, and therefore efficiency of permeation of the ion flow 703 through the pore 104 becomes high.

Example 7

In the present example, an example of using the ion guide 103 with an aspect different from Example 1, Example 5, and Example 6 will be explained.

Figure 14A:
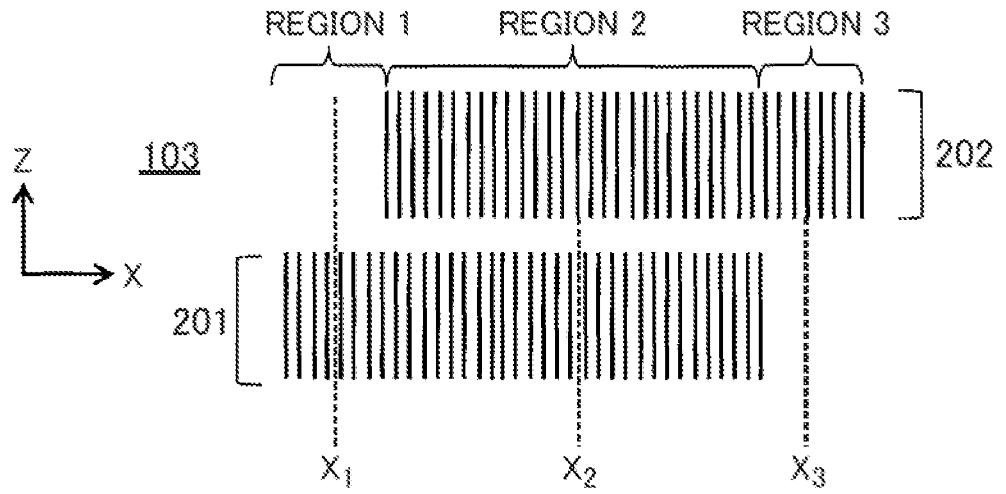
FIG. 14 is a configuration example of an ion guide to separate an ion flow and an air flow according to Example 7 of the present invention.

FIG. 14 shows a configuration example of the ion guide 103 according to Example 7. The ion guide 103 includes the first electrode set 201 and the second electrode set 202. According to the present example, the ion guide 103 is configured of a ring stack electrode. For example, the first electrode set 201 and the second electrode set 202 are ring stack electrodes formed by stacking ring-shape electrodes in the region 1 or the region 3.

An RF voltage of an opposite phase is applied to electrodes adjacent to each other in the X-axis direction, and an RF voltage of the same phase is applied to rings of the same position in the X-axis direction. The off set DC voltage is similar to that of Examples described above.

The diameter of the ring electrode of the first electrode set 201 and the diameter of the ring electrode of the second electrode set 202 may be same with and different from each other. However, when the diameter of the second electrode set 202 is made smaller than the diameter of the ring electrode of the first electrode set 201, the ion flow 703 is converged more strongly in the region 3, and the efficiency of permeation through the pore 104 becomes high which is preferable.

Figure 14B:
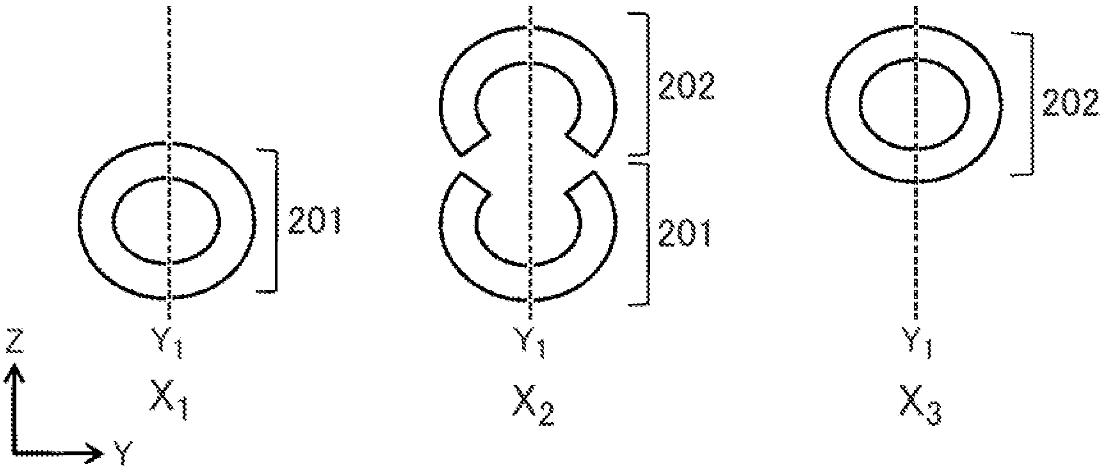
Figure 14C:
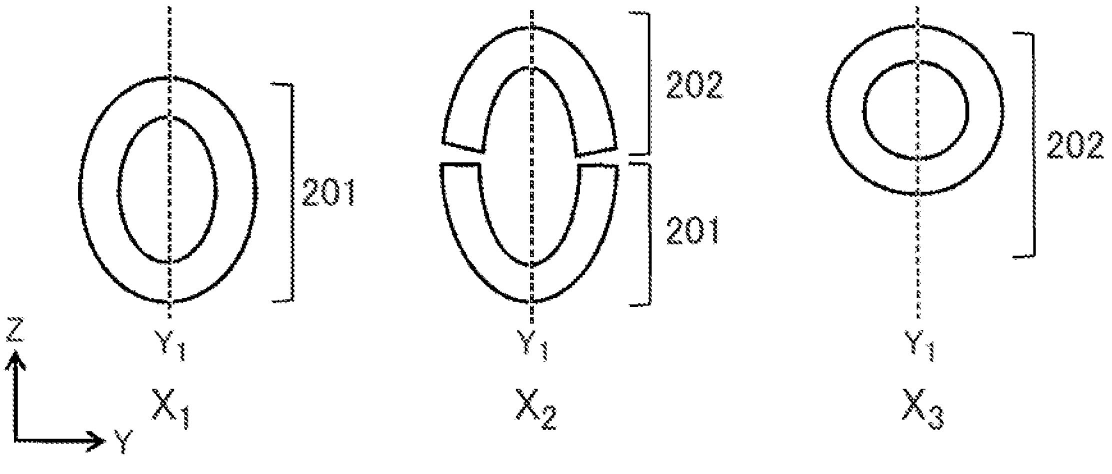

The shape of the ion guide 103 in the region 2 may be a shape where there exists a constriction between the first electrode set 201 and the second electrode set 202 and a barrier of the pseudopotential is formed as FIG. 14B, and may be a shape where a barrier of the pseudopotential is not formed as FIG. 14C.

Example 8

In the present example, an example of using the ion guide 103 with an aspect different from Example 1, Example 5, Example 6, and Example 7 will be explained.

FIG. 15 shows a configuration example of the ion guide 103 according to Example 8. The ion guide 103 is different from Examples described above in terms that the region 1 or the region 3 is not included.

Figure 15A:
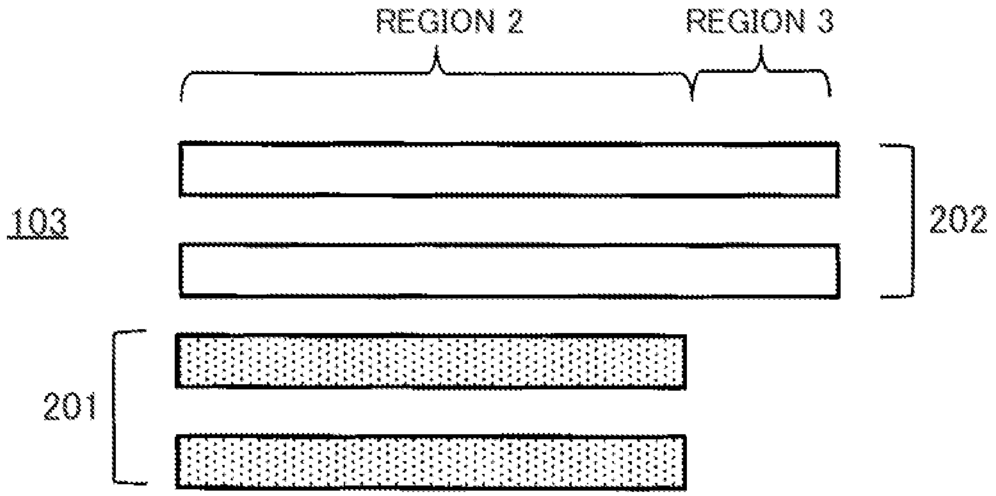
FIG. 15 is a configuration example of an ion guide to separate an ion flow and an air flow according to Example 8 of the present invention.

FIG. 15A is a configuration example of the ion guide 103 not including the region 1. Such modification is applicable to the ion guide 103 of all aspects having been explained in Examples described above. The principle in separating the ion flow 703 and the air flow 704 from each other by the ion guide 103 is also similar to that of Examples described above. Since there is not the region 1, the length in the X-axis direction of the ion guide 103 can be shortened.

Figure 15B:
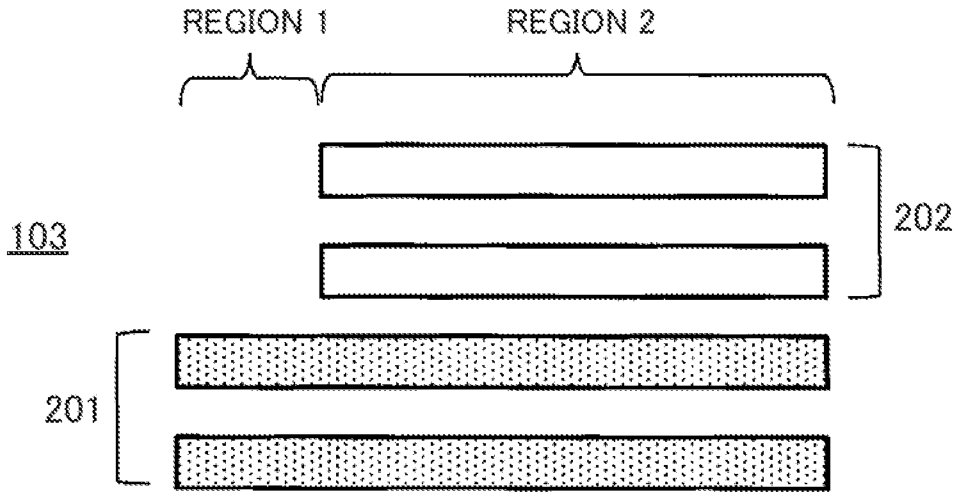

FIG. 15B is a configuration example of the ion guide 103 not including the region 3. Such modification is applicable to the ion guide 103 including a pseudopotential barrier between the first electrode set 201 and the second electrode set 202 in the region 2.

Also, not only the region 3 but also the region 1 can be omitted further. With such modification, the ion guide 103 can be shortened further compared to the configuration of FIG. 15A.

By combination of the ion guide 103 of FIG. 15 and the current plate 113, a mass spectrometer that is compact, excellent in permeation efficiency of the ion flow 703, and stable in an ion signal can be provided.

Example 9

In the present example, an example of using the ion guide 103 with an aspect different from Example 1, Example 5, Example 6, Example 7, and Example 8 will be explained.

Figure 16:
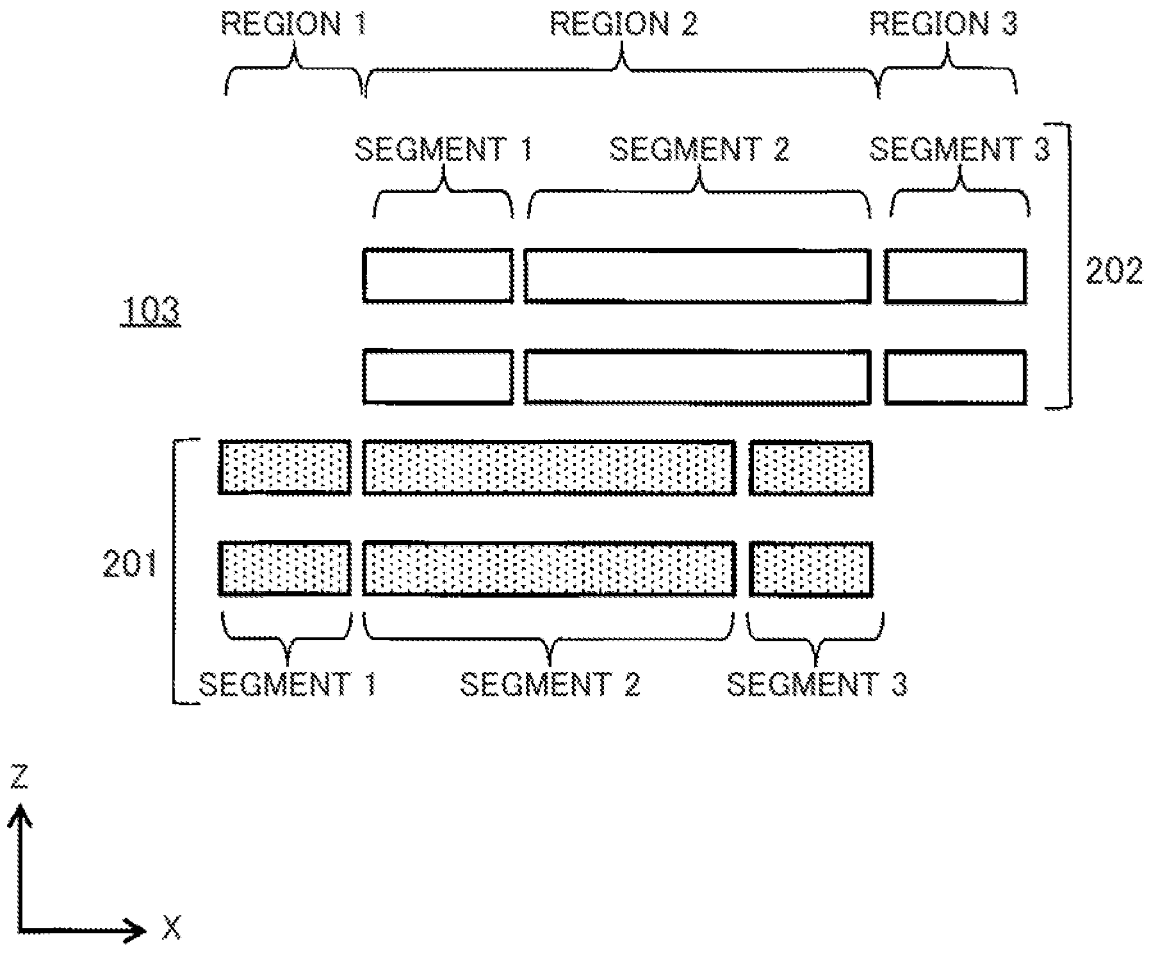
FIG. 16 is a configuration example of an ion guide to separate an ion flow and an air flow according to Example 9 of the present invention.

FIG. 16 shows a configuration example of the ion guide 103 according to Example 9. In the ion guide 103, the first electrode set 201 or the second electrode set 202 is divided into plural segments in the X-axis direction. Particularly, in an example of FIG. 16, the first electrode set 201 and the second electrode set 202 are divided into three segments respectively.

Respective segments are electrically insulated from each other. Respective segments may be insulated by leaving a gap, and may be insulated by filling the gaps between respective segments with an insulating material and connecting the segments with reach other.

Within the same electrode set, the frequency, the amplitude, and the phase of the RF voltage to be applied between the segments are same, but the offset DC voltage to be applied is changed. The offset DC voltage is applied to each rod so as to monotonically change in the X-axis direction and to monotonically change in the Z-axis direction also for example.

For example, by changing the gradient of the DC potential according to the position in the X-axis direction, the DC potential being generated between the first electrode set 201 and the second electrode set 202 in the region 2, the ion flow 703 and the air flow 704 can be separated from each other more efficiently.

Also, in the second electrode set 202, by arranging the DC potential gradient where the DC potential of the segment 1 is made high and the DC potential of the segment 3 is made low, the ion flow 703 can be transferred to the pore 104 more efficiently.

Other Examples

The present invention is not limited to examples described above, and various modifications are included. For example, examples described above were explained in detail for easy understanding of the present invention, and is not to be necessarily limited to one including all configurations having been explained. Also, a part of a configuration of an example can be substituted by a configuration of other examples, and a configuration of an example can be added with a configuration of other examples. Further, with respect to a part of the configuration of each example, it is possible to add other configurations, to be deleted, and to be substituted.

Also, each configuration, function, processing unit, processing means, and the like described above may be achieved by hardware by designing a part or all thereof by an integrated circuit for example. Also, each configuration, function, and the like described above may be achieved by software by that a processor interprets and executes a program achieving each function. Information of a program, a table, a file, and the like achieving each function can be placed in a recording device such as a memory, a hard disk, and an SSD (Solid State Drive) or a recording medium such as an IC card, an SD card, and a DVD.

Also, with respect to a control line and an information line, those considered to be required for explanation are shown, and all control lines and information lines of a product have not necessarily been shown. It is possible to consider that almost all configurations are actually connected with each other.

LIST OF REFERENCE SIGNS

101 ion source
102 pore
103 ion guide
104 pore
105 mass spectrometry unit
106 detector (detection unit)
107 first vacuum chamber
108 second vacuum chamber
109, 110 vacuum pump
111, 112 exhaust port
113 current plate (straightening member)
201 first electrode set
202 second electrode set
201*a* to 201*h*, 202*a* to 202*h* rod
701 barrel shock
702 mach disk
703 ion flow
704 air flow All references, including publications, patents, and patent applications, cited herein are incorporated herein by reference.

The invention claimed is:

1. A mass spectrometer to transfer ions generated in an ion source to a detection unit through a vacuum chamber equipped with electrodes, wherein:

the vacuum chamber includes a first vacuum chamber and a second vacuum chamber communicated by a pore;

an air flow containing ions introduced from the ion source into the first vacuum chamber is separated to an air flow and an ion flow by an ion guide in the first vacuum chamber;

the first vacuum chamber has a straightening member to reduce mixing of the separated air flow and ion flow;

the straightening member comprises an insulating material;

the ion guide has a first electrode set including a first plurality of rod electrodes and a second electrode set including a second plurality of rod electrodes;

the ion guide has a region where the first electrode set and the second electrode set overlap with each other in a longitudinal direction;

the ion guide generates electrical potential to transfer ions incident on the first electrode set from the first electrode set to the second electrode set in the overlapping region;

an incident side end of the straightening member is located between a center axis of the first electrode set and a center axis of the second electrode set, and an exit side end of the straightening member is located below the center axis of the second electrode set and farther from the first electrode set than the incident side end such that the straightening member has an inclined surface relative to the center axis of the second electrode set; and the incident side end of the straightening member is surrounded by the first and second pluralities of rod electrodes.

2. The mass spectrometer according to claim 1, wherein the straightening member keeps in contact with a wall of the first vacuum chamber at an exit side end.

3. The mass spectrometer according to claim 1, wherein the straightening member keeps in contact with the second electrode set.

4. The mass spectrometer according to claim 1, wherein the straightening member is tabular.

5. The mass spectrometer according to claim 1, wherein the straightening member is cylindrical.

6. The mass spectrometer according to claim 1, wherein both ends of the straightening member extend toward the side of the ion flow instead of the air flow in a cross section perpendicular to a center axis of the second electrode set.

7. The mass spectrometer according to claim 1, wherein the ion guide forms a single ion guide in the overlapping region.

8. The mass spectrometer according to claim 1, wherein the ion guide has a potential barrier between the first electrode set and the second electrode set in the overlapping region.

9. The mass spectrometer according to claim 1, wherein the ion guide comprises a multipole comprising rod electrodes.

10. The mass spectrometer according to claim 1, wherein the ion guide comprises a ring stack electrode.

* * * * *